July 25, 1933.                  W. LUTHI                   1,919,895
                    CIRCUIT BREAKER PROTECTIVE SYSTEM
                        Filed June 19, 1931
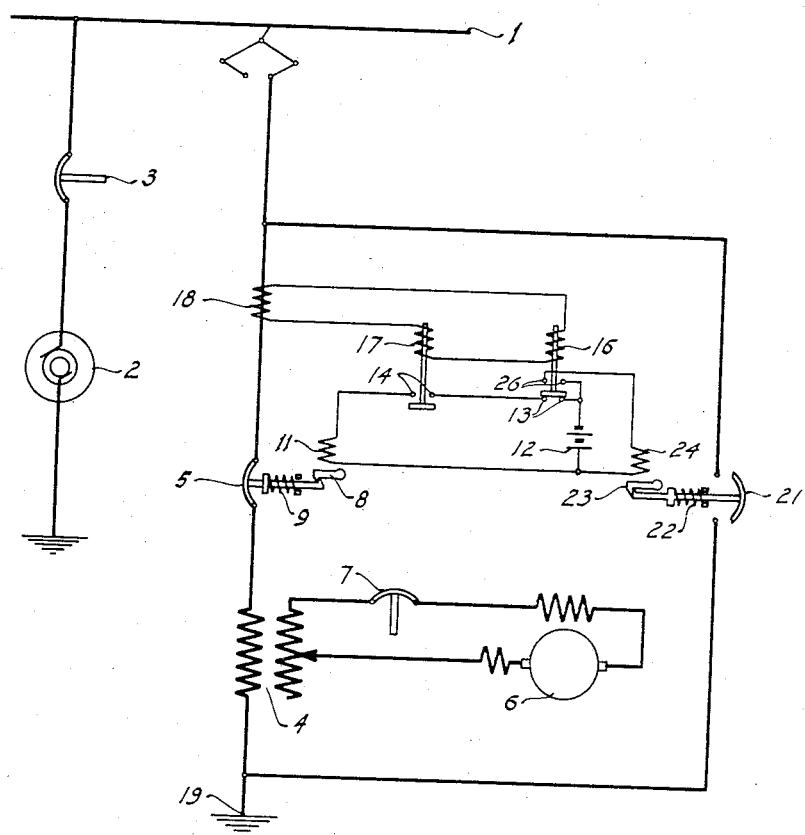
Inventor
  Walter Luthi
By
                Attorney Patented July 25, 1933

1,919,895

UNITED STATES PATENT OFFICE

WALTER LUTHI, OF ENNETBADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

CIRCUIT BREAKER PROTECTIVE SYSTEM

Application filed June 19, 1931, Serial No. 545,614, and in Germany July 3, 1930.

This invention relates to improvements in protective systems and particularly to protective systems for circuit breakers with automatic overload protection.

When a circuit breaker is equipped with an automatic release, a current may be received or carried which is greater than the highest current for which the disconnecting device is constructed. Such cases occur particularly in electric locomotives in which overloads oftentimes exceed the highest limits for which the switches are constructed. Even the use of a relay by which the disconnecting circuit of the circuit breaker is interrupted so that the circuit breaker remains closed, as was done heretofore, and an automatic switch opened, does not guarantee the proper protection. Other switching actions may also take place during such overload on apparatus which is not suitable for use with high overloads.

The above disadvantages may be avoided and the main circuit breaker as well as all of the remaining switching apparatus may be protected during failure of the circuit breaker opening circuit upon the occurrence of an overload if, upon the occurrence of an overload exceeding the limits for the circuit breaker, the supply line is short-circuited or grounded so that the switching devices to be protected lose their voltage and the supply line is disconnected from the source of voltage by circuit breakers of adequate capacity.

It is, therefore, among the objects of the present invention to provide a protective system for circuit breakers in which the protective system is so designed that the disconnecting device for the circuit breaker operates at overloads up to a pre-determined limit and that another portion of the system operates to ground the circuit breaker upon the occurrence of overloads exceeding a pre-determined limit.

Another object of the invention is to provide a protective system for circuit breakers in which system a circuit is provided to cause operation of the opening device for the circuit breaker upon the occurrence of a pre-determined overload and another circuit is provided which will cause grounding of the circuit breaker upon the occurrence of an overload exceeding the pre-determined permissible limits.

Another object of the invention is to provide a circuit breaker protective system which is divided substantially into two circuits cooperating with each other, the one circuit causing energization of the opening means for the circuit breaker upon the occurrence of an overload of a certain magnitude and the other circuit causing grounding of the circuit breaker upon the occurrence of an overload of greater magnitude.

Objects and advantages, other than those above set forth, will be apparent from the following description when read in connection with the accompanying drawing which diagrammatically illustrates one embodiment of the present invention applied to a circuit breaker capable of connecting a supply line and a line to be supplied with electric current.

Referring more particularly to the drawing by characters of reference, the reference numeral 1 designates a supply line from a suitable source of electric current supplied with current from a source 2 through a suitable circuit breaker 3 and supplying electrical apparatus such as a transformer 4 through a circuit breaker 5. It will be understood that the transformer 2 supplies a circuit such as that of a motor 6 through a circuit breaker 7. The circuit breaker 5 is provided with a latch 8 normally retaining the circuit breaker in closed position against the action of a spring 9. The latch 8 may be released by energization of a coil 11 from a source of current 12 upon bridging of several pairs of contacts 13 and 14.

The pairs of contacts 26 and 14 are arranged to be bridged upon energization of relays 16 and 17 respectively from the secondary winding of a current transformer 18, the primary winding of which is connected into the circuit of the transformer 4. Under normal conditions of operation, the armature of relays 16 and 17 will be in the position shown i. e. relay 16 will bridge contact 13 and relay 17 will not be in position to bridge contact 14.

A conductor is connected between the circuit breaker 5 and ground at 19 through a switch 21 which is biased toward the closed position by a spring 22. The switch 21 is however retained in the open position, under normal conditions, by a latch 23 which may be retracted by a coil 24. The coil 24 is capable of energization from the source 12 upon energization of relay 16 which lifts its armature to close a pair of contacts 26 to complete a circuit with the coil 24 and the source 12.

In operation, during normal conditions in the transformer 4 and circuit breaker 5, the circuit breaker is closed, relays 16 and 17 are de-energized, the armatures of the relays therefore being in the position shown, and switch 21 is held open by latch 23. Upon the occurrence of an overload on the transformer 4 and the circuit breaker 5, of such magnitudes that it may still be safely interrupted by the circuit breaker, relay 17 will be energized to bridge contacts 14 whereby a circuit is completed from the source of current 12 to the coil 11 which retracts the latch 8 and permits circuit breaker 5 to open under the action of the spring 9. Relay 16 is so designed that it will not operate under the above conditions.

If an overload however occurs for which interruption by the circuit breaker 5 would no longer be safe, relay 16 will be energized at the same time as relay 17 is energized; contacts 13 will therefore be opened and contacts 26 will be closed. Even though relay 17 has closed contacts 14, there is no circuit completed from the source of current 12 to the coil 11 for the reason that the contacts 13 are open. A circuit is however completed, by relay 16, from the source of current 12, over the contacts 26 to coil 24 which retracts latch 23 thereby permitting switch 21 to close under the action of the spring 22. Line 1 and circuit breaker 3 are thus directly grounded so that any automatic switches such as are usually present in the supply stations as at 3 may operate to disconnect that line section.

Circuit breaker 5 may then be safely opened by hand and all of the apparatus beyond the circuit breaker such as the circuit breaker 7 may be operated without current thereby avoiding currents beyond the capacity of such apparatus. The present system may be used wherever overloads beyond the limits of the switchgear are encountered for high or low voltage installation and for alternating current as well as direct current. The system has the special advantage that, as a result of the grounding of the lines, a much safer protection of operating personnel against danger from voltage conductive portions, arcs and the like is obtained.

Although but one embodiment of the present invention has been illustrated and described, it will be apparent to those skilled in the art that various changes and modifications may be made therein without departing from the spirit of the invention or from the scope of the appended claims.

The invention claimed is:

1. In a protective system, a supply line, apparatus to be supplied, a circuit breaker to connect said apparatus with said line, means to cause disconnection of said apparatus by said circuit breaker upon the occurrence thereon of overloads suitable for interruption thereby, and means to ground said supply line and said apparatus upon the occurrence of overloads thereon unsuitable for interruption by said circuit breaker.

2. In a protective system, a supply line, apparatus to be supplied, a circuit breaker to connect said apparatus with said line, a circuit to cause disconnection of said apparatus by said circuit breaker, a source of current to energize said circuit, means operable upon the occurrence of an overload on said apparatus suitable for interruption by said circuit breaker to cause energization of said circuit, and means to ground said supply line and said apparatus upon the occurrence of overloads thereon unsuitable for interruption by said circuit breaker.

3. In a protective system, a supply line, apparatus to be supplied, a circuit breaker to connect said apparatus with said line, a circuit to cause disconnection of said apparatus from said line by said circuit breaker, a source of current to energize said circuit, a plurality of relays to control said circuit, a current transformer connected with said supply line to energize one of said relays to cause disconnection of said apparatus from said line by said circuit breaker upon the occurrence of overloads thereon suitable for interruption thereby and to energize another of said relays to ground said line upon the occurrence of overloads thereon unsuitable for interruption by said circuit breaker, the energization of the said another of said relays being operable to prevent operation of said circuit breaker by said source of current.

4. In a protective system, a supply line, apparatus to be supplied, a circuit breaker to connect said apparatus with said line, means to cause disconnection of said apparatus from said line by said circuit breaker upon the occurrence thereon of overloads suitable for interruption thereby, a switch connecting said line with ground, a circuit to cause closing of said switch, a source of current capable of energizing said circuit, and a relay operable upon the occurrence of overloads unsuitable for interruption by said circuit breaker to connect said circuit and said source of current.

5. In a protective system, a supply line, apparatus to be supplied, a circuit breaker to connect said apparatus with said line, means to cause disconnection of said apparatus from said line by said circuit breaker upon the occurrence thereon of overloads suitable for interruption thereby, a switch connecting said line with ground, a circuit to cause closing of said switch, a source of current capable of energizing said circuit, a current transformer connected with said line, and a relay capable of energization from said transformer to connect said source of current into said circuit upon the occurrence of overloads in said apparatus unsuitable for interruption by said circuit breaker.

6. In a system for protecting a circuit breaker connecting a supply line and apparatus to be supplied from operation at excessive overloads, opening means for the circuit breaker, a source of current to cause energization of said opening means, a plurality of relays cooperating to control connection of said source of current and said opening means, a current transformer connected with the line to cause operation of said relays upon the occurrence of an overload, said relays operating selectively dependent upon the magnitude of the overload, a switch capable of grounding the circuit breaker, and means for closing said switch, one of said relays controlling operation of said switch closing means upon the occurrence of overload on the line of such magnitude as to be unsuitable for interruption by the circuit breaker.

7. In a protective system, a supply line, apparatus to be supplied from said line, a circuit breaker operable to connect and disconnect said apparatus with and from said line, means for causing operation of said circuit breaker to disconnect said line from said apparatus upon the occurrence of overloads thereon suitable for interruption by said circuit breaker, and means for establishing a low resistance shunt connection across said apparatus and said circuit breaker upon the occurrence of overloads thereon unsuitable for interruption by said circuit breaker.

8. In an electric protective system, a supply line, apparatus to be supplied from said line, a circuit breaker operable to connect and disconnect said apparatus with and from said line, means for causing operation of said circuit breaker to disconnect said line from said apparatus upon the occurrence of overloads thereon suitable for interruption by said circuit breaker, a switch operable to establish a low resistance shunt connection across said apparatus and said circuit breaker, a source of current for operating said switch, and means operable upon the occurrence of overloads unsuitable for interruption by said circuit breaker for establishing operative connection of said source of current with said switch.

WALTER LUTHI.